Dec. 7, 1948.  R. V. HICKS  2,455,486
LIQUID FILTRATION
Filed July 10, 1943  4 Sheets-Sheet 1
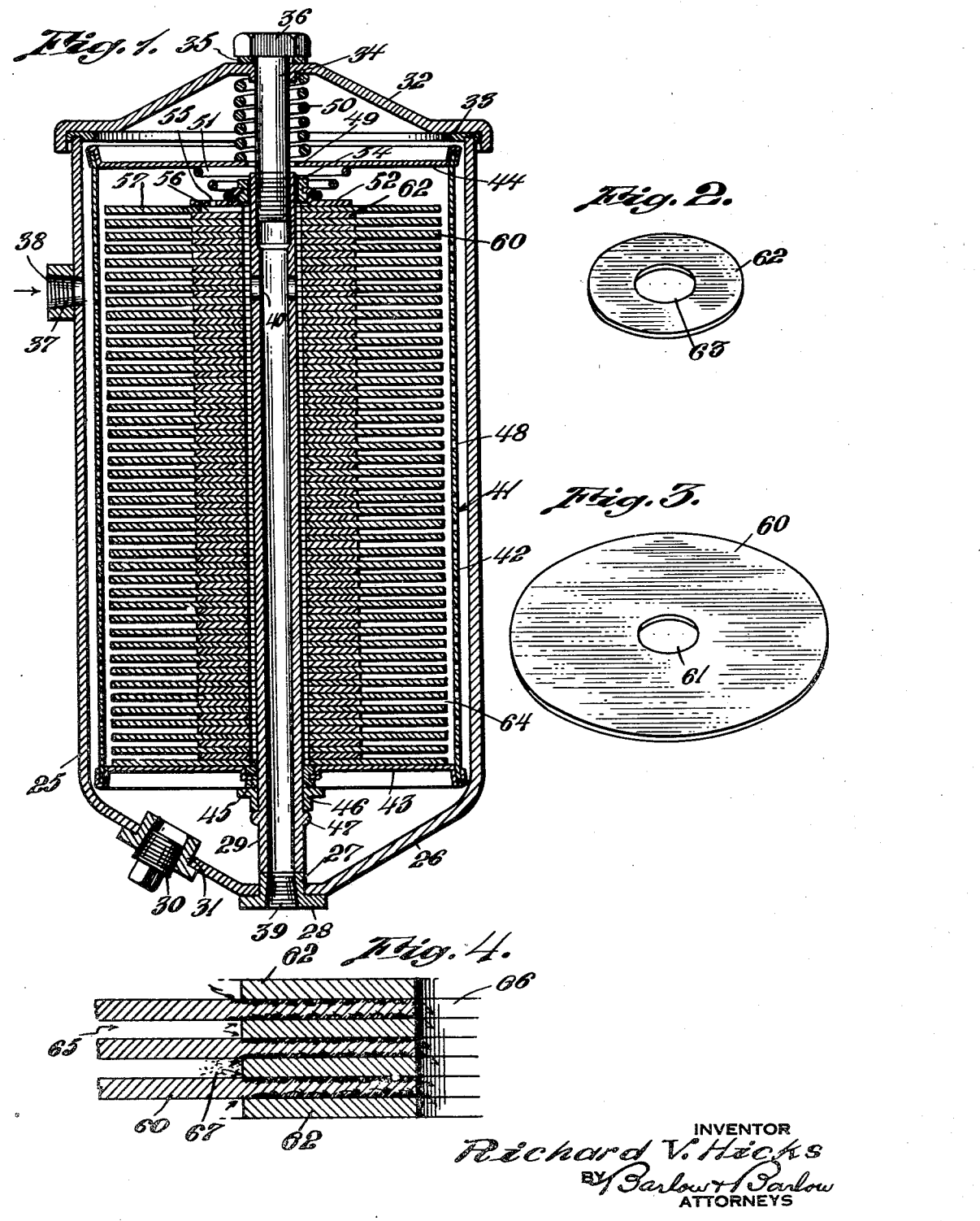
INVENTOR
Richard V. Hicks
BY Barlow & Barlow
ATTORNEYS

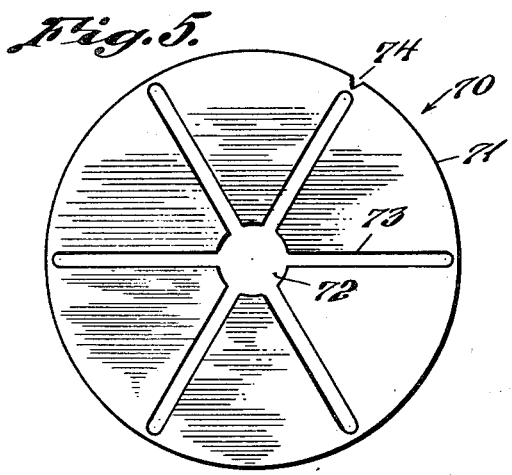
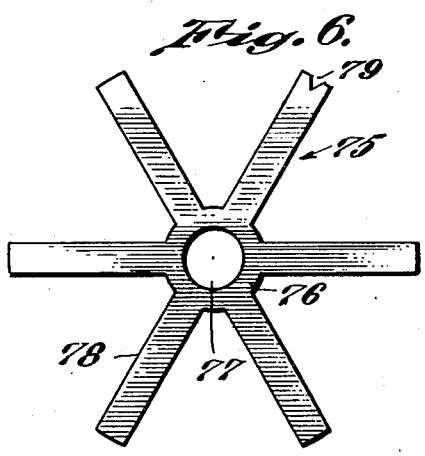
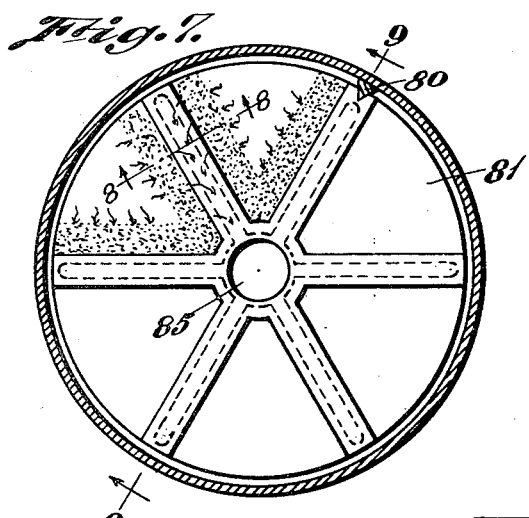
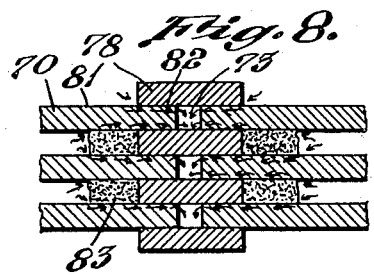
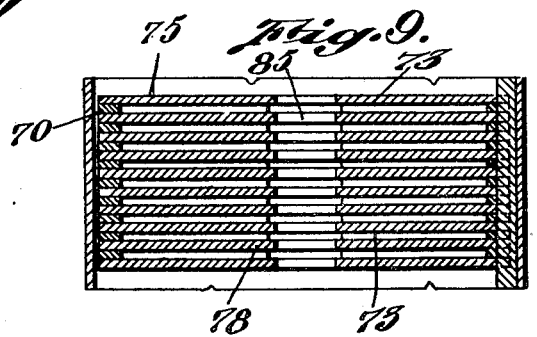

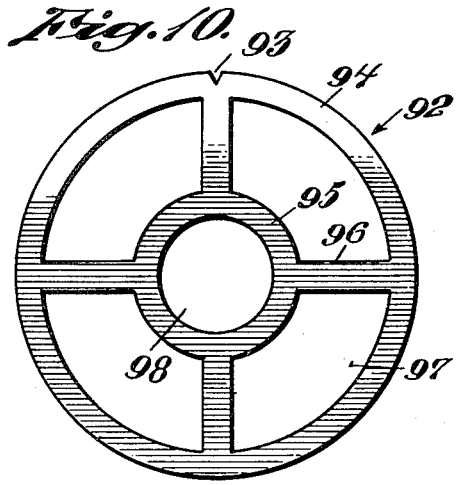
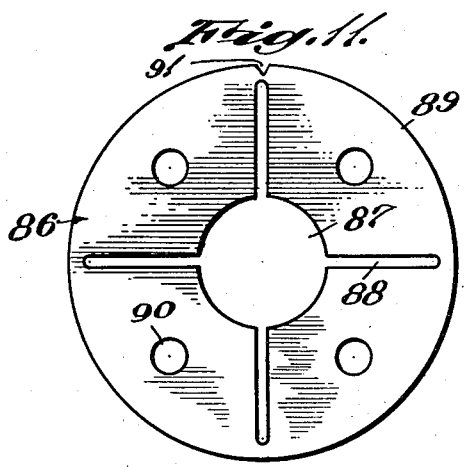
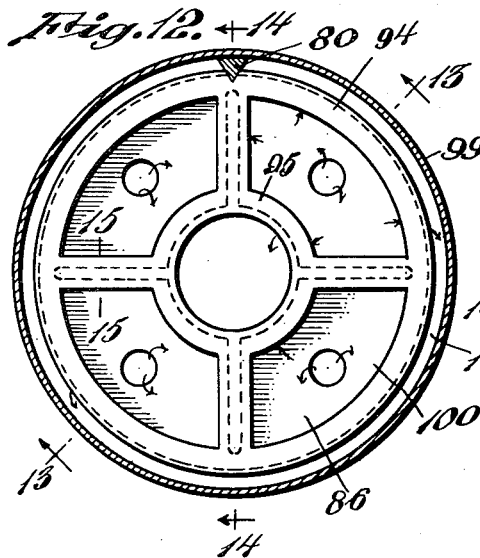
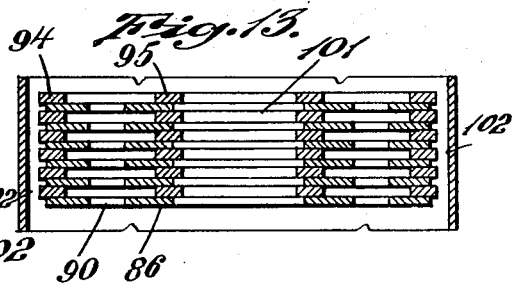
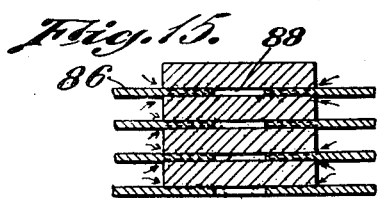

Dec. 7, 1948.    R. V. HICKS    2,455,486
LIQUID FILTRATION
Filed July 10, 1943    4 Sheets-Sheet 4
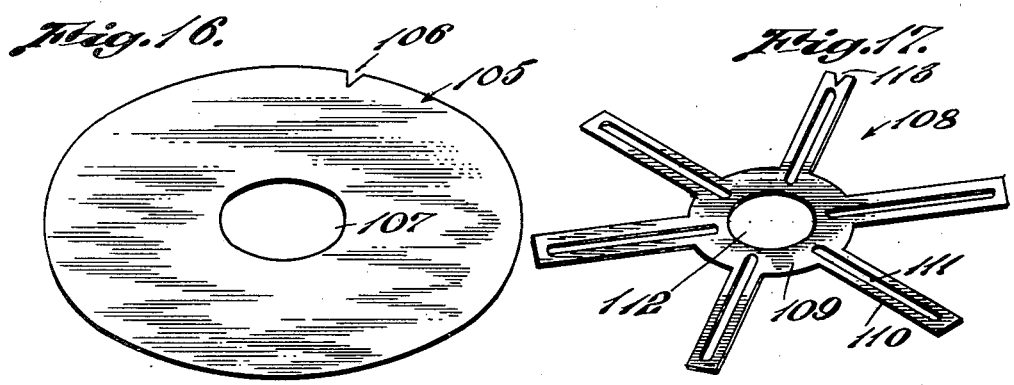
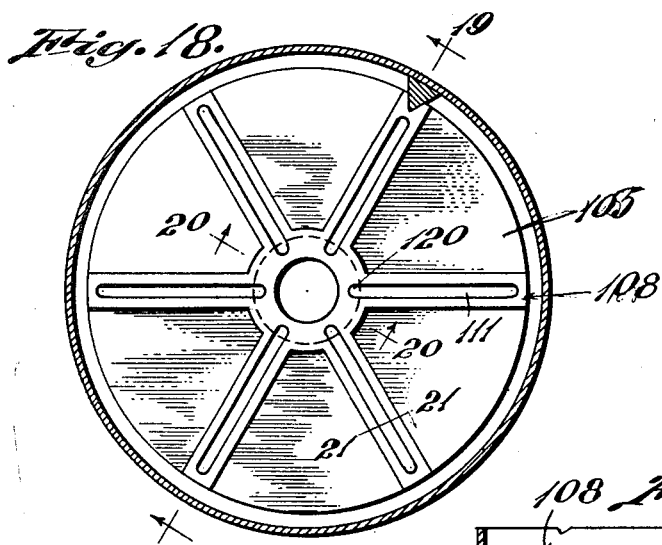
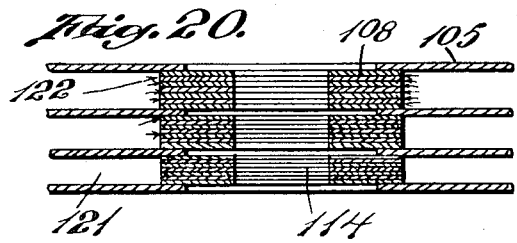
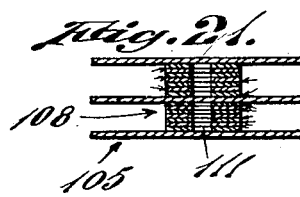
INVENTOR
Richard V. Hicks
BY Barlow & Barlow
ATTORNEYS Patented Dec. 7, 1948

2,455,486

UNITED STATES PATENT OFFICE 2,455,486

LIQUID FILTRATION

Richard V. Hicks, East Providence, R. I., assignor to Fram Corporation, a corporation of Rhode Island Application July 10, 1943, Serial No. 494,223

30 Claims. (Cl. 210—169)

This invention relates to the filtration of any liquid likely to contain some contaminant of a more or less solid nature, and is a continuation-in-part of my application, Serial No. 443,934, filed May 21, 1942. It is particularly adapted for use in the filtering of lubricating oils for internal combustion engines and other mechanisms, and of fuel oils for Diesel engines or the like, but is susceptible of other uses, as removing particles from a liquid coolant for industrial purposes. The invention comprises novel methods of effecting and controlling such filtration together with filter means of simple and readily manufactured structure for practicing the methods.

One known type of filter is that using some loosely compacted mat through which the filtrate may permeate while the contaminant of the liquid lodges in the mat. Other filters are those known as the edge type, in which the liquid passes between two parallel surface structures in contact or near contact over substantial areas, with the deposit of such contaminant as may be collected thereby being located chiefly outside the confines of the surface elements, at their edge portions, the more or less solid contaminating substance being excluded from entry between those elements. While the present invention has some structural analogy to this latter edge type of filter it is organized upon basically distinctive operating principles. For example, in the ordinary edge-type filter proper functioning is interrupted by the collection of an amount of contaminant about the edges of the surface members which obstructs entrance of the liquid between them. This residue from the filtrate usually must be removed, in the ordinary edge-type filter, as by some scraping or combing action or sometimes by flow reversal, to enable the filter to function further. In the filter of my present invention, however, I distribute the collected contaminant over a supporting surface and avoid an obstructing collection of residue at outer edge surfaces and materially prolong the normal operating period within which the filter functions without requirement for residue removal.

Among the objects of my invention is that of providing a filter which will be relatively free flowing throughout the life of the contaminant collecting cartridge, and in which the flow will not appreciably be progressively retarded as the contaminant is collected by the filter.

The invention also contemplates a filter construction such that by different designs the speed of flow of the filtrate may be increased or decreased depending upon the conditions under which it is desired that the filter operate, the arrangement being such that I may elect to increase either the speed of flow or the capacity for collecting contaminant, increasing either of these factors at the expense of the other, by relatively proportioning them to suit the particular circumstances and requirements.

A further important feature of the invention is that of building the contaminant back along the direction from which the flow comes and to utilize that contaminant as a means for screening out additional contaminant either smaller sized particles by movement of the filtrate through the first selected contaminant or the collection of additional contaminant by movement of the filtrate between the collected contaminant and the surface upon which it is being collected.

A further object of the invention is to cause the filtrate to move laterally parallel to the plane of the walls forming the filter either along the face of the walls or through the walls and to then conduct the filtrate axially from the cartridge.

With these and other objects in view the invention consists of certain novel methods of procedure or features of construction, as will be more fully described and particularly pointed out in the appended claims.

The accompanying drawings are illustrative of several embodiments of the invention, and of means for practicing the methods thereof.

Fig. 1 is a central longitudinal section showing one form of filter in accordance with the invention;

Figs. 2 and 3 are individual perspective views of two members, one spacer and one wall, respectively, of the series thereof in individually alternating succession in the filtering unit or assembly of Fig. 1;

Fig. 4 is an enlarged fragmental sectional view illustrating the members of Figs. 2 and 3 superimposed one on the other and illustrating by means of arrows the movement of the filtrate through the wall member to the central axial opening of the stack.

Fig. 5 shows a modified form of wall in top plan view;

Fig. 6 is a top plan view of a modified form of spacer member for placement in cooperative relation with the wall of Fig. 5.

Fig. 7 is a sectional view through the cartridge and illustrating the spacer member of Fig. 6 superimposed upon the wall of Fig. 5, also showing in two cells the collection of contaminant along the supporting section of the wall of Fig. 5;

Fig. 8 is a sectional view taken on substantially line 8—8 of Fig. 7 and illustrating by means of arrows the flow of filtrate and the deposit of contaminant along the supporting surfaces as illustrated in Fig. 7;

Fig. 9 is a section on line 9—9 of Fig. 7;

Figs. 10 and 11 are top plan views respectively of spacer member and wall member of a modified form with respect to the spacer and wall members heretofore described;

Fig. 12 is a sectional view through the cartridge casing and illustrating the spacer of Fig. 10 superimposed upon the wall of Fig. 11;

Fig. 13 is a section on line 13—13 of Fig. 12;

Fig. 14 is a section on line 14—14 of Fig. 12;

Fig. 15 is a fragmental sectional view on substantially line 15—15 of Fig. 12 and illustrating by means of the arrows the movement of the filtrate oil with respect to the members;

Figs. 16 and 17 are perspective views of modified forms of wall and spacer members;

Fig. 18 is a sectional view through the cartridge illustrating the spacer member of Fig. 17 superimposed upon the wall of Fig. 16;

Fig. 19 is a section on line 19—19 of Fig. 18;

Fig. 20 is a section on line 20—20 of Fig. 18; and

Fig. 21 is a section on line 21—21 of Fig. 18. Both Figs. 20 and 21 illustrating by means of arrows the flow of oil through the crevices between a superimposed stack of spacer members forming the spacer by means of several plies between each wall.

In forming the filter of the present invention, I provide a plurality of cells in which the contaminant may collect. These cells are presented by means of members having similar generated surfaces about an axis so as to provide broad faced surfaces which contacts along a substantial area and which may take the form of a plate or disc and which is referred to as a wall member and intermediate spacer members of sufficient area together affording a filter in which the filtrate may pass generally at right angles to the axis of the stack of members.

The filtrate may pass either into and through one or both of the members or through the crevices between the members if such exists. As the contaminant builds up in the cell it will at first exist in a soft mass and filtrate may pass through the contaminant to additionally collect smaller particles which may be contained in the liquid medium to be filtered. As the contaminant packs more firmly into the cells it may occur that the filtrate will pass between the contaminant as a solid cake and the wall which supports the contaminant cake. I find, however, that a large mass of contaminant may thus be collected without detrimentally obstructing the passage of the filtrate.

The wall and spacer members which are used may take widely varying forms, and I have shown several of such forms in this application to illustrate different desired features which may be emphasized while maintaining the same basic thought of operation throughout.

In Fig. 1 there is illustrated the filter casing and the removable cartridge in position therein. This casing consists of a generally cylindrical wall 25 having a downwardly tapering bottom 26 with a central opening receiving a collar 27 flanged at 28 on the outer surface of the bottom wall. An upwardly extending center tube 29 is butt welded to the collar 27 and extends upwardly through the center axis of the cylindrical side wall 25. A drain plug 30 is also provided in the bottom wall entering a suitably threaded flanged collar 31 fixed therein. The upper edge of the cylindrical wall 25 is closed by a cover 32 with a washer 33 positioned between the two to obtain a tight fit. A bolt 34 is threaded into the upper end of the center tube 29 to hold the cover in position while a sealing washer 35 is positioned below the head 36 of the bolt on the outer surface of the cover about the opening through which the bolt extends. Side wall 25 also has an entrance opening 37 threaded as at 38 for the entrance of fluid to be filtered while the discharge occurs through the center tube 29 having the threaded end 39 to which some tubular conduit is attached. Oil enters this discharge central tube through one or more openings 40 provided therein.

In order that filtering may occur in this casing I have interposed a cartridge containing a filtering medium between the inlet opening 37 and the outlet opening 40. This cartridge is designated generally 41. It consists of a cylindrical perforated wall 42 having a bottom wall 43 and a top wall 44 which are rolled into engagement with the side wall. The bottom wall is fitted with a resilient grommet 45 which tightly fits the center tube 29 providing an oil seal and rests upon a seat 46 which in turn rests upon raised portions 47 on the tube 29. This resilient grommet 45 may be of any oil resisting material such for instance as "neoprene" or cork and will prevent the passing of oil at this location requiring that the oil enter the cartridge through the perforations 48 provided along the side walls. The top wall is provided with an opening 49 which loosely fits about the bolt 34 while a spring 50 acting on the under side of the cover as an abutment and upon the top wall 44 of the cartridge presses the cartridge toward the seat provided by the member 46.

Contaminant is removed from the liquid to be filtered within this cartridge which consists generally of a stack of members resting upon the bottom wall 43 and pressed into engagement with each other by means of a spring 51 acting between the under side of the top wall 44 of the cartridge shell and a capping plate 52 which presses on the stack of members. This capping plate is provided with a grommet 54 which may loosely fit about the center tube 29 and permit some oil to by-pass therethrough. Additional by-passing may occur if desired, however, by reason of an opening 55 in this capping plate and an opening 56 in an upper plate 57 which is located just beneath the capping plate, which opening 56 connects with the central aligned openings of the several members which go to provide the filter and which will now be described in some of the many variant forms which they may take in carrying out my invention.

By-passing is provided for only when it is desired to provide for some heating of the filter by circulation of the lubricating oil. By-passing would not occur in use of the filter as a fuel oil filter, in which case the grommet 54 would tightly fit the center tube and provide an oil seal.

In Figs. 1 to 4 I have illustrated one form of wall member, and cooperating spacer member to be located between walls. The wall is designated generally 60 as shown in perspective in Fig. 3. It consists of a relatively thin piece of heavy paper, paperboard, cardboard, and the like, or other desirable material which will pass or transmit the filtrate therethrough and is generally circular in shape although rectangular or other shapes may be employed. It has a central opening 61. Among materials found particularly adapted for the purpose are various cellulosic compositions such as wood-base pulp sheets or webs of a more or less porous or bibulous character; by way of but one specific example, an unsized or nonglossy but self-supportingly stiff fibrous sheet comparable to commercial blotter board of average 0.020 in. thickness or thereabouts.

The spacer member designated generally 62 and shown in perspective in Fig 2 is usually somewhat thicker than the wall member 60, depending on the depth of cell desired and is formed of one or more sheets of similar material, such as heavy paper or cardboard or other material although it may be impervious as its ability to pass filtrate therethrough is relatively unimportant. It is generally round, or of a shape corresponding to the shape of the plate 60 and is provided with a central opening 63.

The wall members 60 alternate with the spacer members 62 in a stack or assembly, being spaced by them as indicated in Fig. 1, with the openings 61 and 63 in the members all in vertical or axial alignment.

The space such as designated 64 (Fig. 1) between the walls 60 provides an annular cell for the collection of contaminant. Liquid will enter this cell from the outer portion such as indicated by the arrow 65 (Fig. 4) and pass radially inwardly until it engages the spacer 62. The filtrate portion of the liquid will then pass into the wall member 60 as shown by the arrows (Fig. 4) and pass through this wall member to the centrally aligned openings designated 66 in Fig. 4, thence into the center tube 29 through the opening 40 or some similar opening and then axially and herein downwardly through this tube 29 and out of the filter casing. As contaminent collects as shown at 67 (Fig. 4) the filtrate will enter the wall 60 at an increasingly greater radial distance from the axial center and pass through the central opening 66 as heretofore. It will be apparent that if the spacer 62 is of the same material as the wall 60 the filtrate may initially pass through this spacer 62. However, as the contaminant builds up the passage of the filtrate into and through the wall 60, rather than through the spacer, will more likely take place and thus although the spacer may in the initial instance pass filtrate material very early in the action as the contaminant builds up a flow of the filtrate will occur by entering the wall 60 and passing through the plate while depositing the sludge or contaminant on the surface of the wall. In this manner the wall serves as a medium for collecting the very fine particles as well as the coarser particles.

In some instances the filtrate may pass between the wall and spacer in the crevice along the surface between the two or may partly enter the wall material. In cases where the filtrate material passes through the crevice the contaminant may build up into cake form to in effect increase the radial dimension of the spacer and provide a surface which engages the surface of the wall and acts as an extension of the crevice. In other instances the filtrate may pass partly through the contaminant and then pass either into the wall or through a crevice between the wall and the contaminant or a crevice between the spacer and the wall in making its pasage to the lower pressure area at the center of the stack.

In all of these cases the filtrate passes generally at right angles to the axis toward the center or axis while depositing and leaving its contaminant in the cells between the walls which may take such shape as the annular form shown in Figs. 1 to 4 or various other shapes some of which will be described. The radial distance between the center hole 63 of the spacer 62 and outer periphery of this spacer will define the extent through which the filtrate must pass in its radial path after depositing its sludge and will thus to a substantial extent govern the speed of flow especially in the initial or starting operation of the filter. This embodiment of the invention illustrates an undirectional flow or one in which the flow occurs from the outside of the stack inwardly to a center passage and then out of the filter casing.

Another modification embodying a construction of the walls and spacers more particularly for a one-directional flow of the liquid, is shown in Figs. 5 to 9, inclusive. The walls as shown in Fig. 5 and designated generally 70 have a circular or other shaped periphery 71 and a central opening 72 from which slots 73 extend radially to a point just short of the periphery 71 so that these slots are closed at their outer ends and each wall is a unitary structure. Notches 74 are provided for alignment purposes as will hereinafter appear. The spacer for this wall is designated 75 and is shown in Fig. 6. It consists of a central annulus 76 having a central opening 77. A plurality of spokes 78, the same in number as the slots 73 of the walls, extend from the annulus 76 and are proportioned and arranged to cover each of such slots 73 of the adjoining walls. A notch 79 registers with notch 74.

These walls 70 and the spacers 75 again are stacked or disposed axially one behind the other in the cartridge designated generally 41 as shown in Fig. 1 which in this instance will have a rib 80 (see Fig. 7) to enter the notches 74 and 79 and maintain the members 70 and 75 in alignment. The spokes 78 will cover each slot 73 and provide sector-shape cells 81, Fig. 7, for the reception of contaminant.

In this arrangement of the members a much shorter path occurs through the wall from the point of deposit of the contaminant to the opening for free passage of the filtrate from the pack. For instance as shown in Fig. 7 and Fig. 8 liquid to be filtered will enter the cell 81 and pass into the wall 70 at a point distant from the lead away passage or slot 73 by the amount that the spoke 78 covers the marginal edges of the slot 73. The arrows 82 (Fig. 8) show the short distance required. The sludge 83 will collect along the edges of each of the spokes and build back toward the flow of liquid to be filtered. In each instance, however, even though the filtrate enters the plate at the edge of the deposited contaminant the distance from this edge of the deposited contaminant to the slot will be relatively short as compared with that described in connection with Figs. 2 to 4. The filtrate leads from each of the slots into the central opening 85 of the aligned members for withdrawal from the cartridge and casing in a manner heretofore described.

In Figs. 10 to 15 I have illustrated another modification embodying a construction of wall and spacer members designed for a flow in two directions, radially inwardly and radially outwardly from an entrance port midway between inner and outer concentric circles. This form of construction will require a different shell or cartridge container.

In the form shown in Figs. 10 to 15 the wall is designated generally 86 and is shown in plan view in Fig. 11. It will consist of the same heavy paper, cardboard or other liquid filtrate transmittable material as heretofore referred to and is shown as generally circular in shape although other shapes may be employed. It has a central opening 87 from which slots 88 radiate outwardly terminating short of the peripheral edge 89 of the wall. The entrance openings 90 are formed between the periphery 89 and the central opening 87, these openings also being located generally midway between the radial slots, thus positioning them in the middle of the sector areas of the wall which provide collection cells for contaminants.

The spacer member designated generally 92 and shown in plan view in Fig. 10 is formed of a material similar to that of which the wall 86 is formed and usually somewhat thicker than the wall 86 depending upon the size of cell desired and is formed of one or more sheets of material similar to that of wall 86 although it may be of an impervious material as its ability to pass filtrate is relatively unimportant as above explained. The spacer is generally round or of a shape corresponding to the shape of the wall 86 and is notched as at 93 to register with the notch 91 of the wall. As shown in Fig. 10 this spacer consists of two concentric annuli 94 and 95 joined together by spokes 96 between which are spaces 97 while there is an opening 98 centrally thereof. The spokes 96 are so arranged as to cover the slot 88 of the wall when the member 92 is superimposed upon the member 86 as shown in Fig. 12, it being understood that the wall and spacer alternate in a stack assembly such as shown in Figs. 13, 14, and 15 where they are held in vertical alignment by reason of the rib 80 of the cartridge 99 as shown in Fig. 12. The central annulus 95 extends inwardly beyond the inner edge of the opening 87 of the wall while the outer annulus 94 extends outwardly beyond the outer periphery 89 of the wall. The spaces between these annuli and the spokes 96, designated 97 in Fig. 10, provide for a collecting cell or compartment designated 100 in Fig. 12 into which the liquid to be filtered may enter through the central aligned holes 90 in the wall. Liquid which enters a compartment 100 will flow inwardly to the center openings 101 of the aligned members and outwardly to the annular chamber 102 provided between the stack of members and the shell 99 of the cartridge. Filtering will occur in a manner similar to that heretofore indicated by the filtrate passing through the wall 86 into the slots 88 as shown in Fig. 15 and leaving the contaminant to build up in the cell or compartment. The contaminant will collect in sector shapes corresponding to the shape of the cell or compartment, building up about the periphery of the sector and gradually accumulating inwardly toward the entrance or flow openings 90 which are aligned for this purpose. It will be apparent that the cartridge shell will be modified from that shown in Fig. 1 to provide an imperforate cylindrical side wall with a bottom wall having perforations to align with the holes 90 of the wall 86. Some means will be provided for communication between the annular portion 102 and the center opening 101 for free flow of filtrate oil to the center opening 101 for entrance into the center tube 29 through openings 40 and then out of the casing.

In the arrangement shown in Figs. 10-15, a much shorter path is provided between the entrance openings 90 and the center opening 85 and annular chamber 102, thus affording a freer flowing of the liquid to be filtered through the filter. Pressure is also exerted in this type of arrangement from the inside outwardly and tends to spread the wall and spacer members apart. Thus, the spring 51 which presses the members together may yield where a pressure occurs greater than the pressure of the spring to spread apart the members and permit oil to pass between the members in an extent sufficient to relieve any congestion or pressure which may have built up.

Referring now to Figs. 16 to 21, inclusive, I have there shown a still variant form of wall and spacer. The individual wall is designated 105 in Fig. 16 and has a circular outer periphery notched as at 106 and provided with a central opening 107. This wall may be of the same material as that heretofore mentioned but the arrangement of this modification is such that this spacer may be of impervious material such as resin treated, resin impregnated, or moisture-proofed paper into which the filtrate of the liquid to be filtered will not penetrate, the filtrate in such case being transmitted by and along the wall 105 and to the plural-ply spacers to be referred to, and between the latter and the walls.

The spacer which is located between walls 105 consists of a plurality of plies of a spoke formation designated generally 108 in Fig. 17. The plies are superimposed in registering relation and formed of the material heretofore described or filtrate impervious material the same as the walls although the impervious material is preferable. Each consists of an annulus 109 with radiating spokes 110, each slotted as at 111 while there is a central opening 112 provided in the annulus 109. One of the spokes is notched as at 113 for the reception of the rib for alignment purposes and for registration with the notch 106 of the wall 105. The plies of spacers 108 may consist of any desired number, there being shown, for illustration, six superimposed upon one another between each wall 105. The number may depend in part on the thickness of the individual plies which in some instances may be extremely thin, of the order of about 0.007 in. in which case as many as 15 or more may be superposed between two walls, in turn depending upon the cell dimension desired. The slots 111 extend inwardly to an extent beyond the opening 107 of the wall so that after the filtrate enters a slot 111 it may flow inwardly into the central opening 114 as shown in Fig. 19 through the space 120, (see also Fig. 18) formed by the wall as shown in these figures.

By this arrangement when the members are stacked as shown in Figs. 18 to 21 a plurality of crevices are provided between the superimposed or multi-ply spacers and between the spacers and the wall whereby filtrate may flow through each of these crevices from the cells 121 (Fig. 20) as shown by the arrows 122 which provides for filtration between the annular members 109 while the filtrate may flow through the crevices as shown by the arrows in Fig. 21 of each of the spokes into the slots 111 and thence radially inwardly to the central openings 114 and thence axially of the filter into the central tube 29 and out of the casing.

In the form of filter shown in Figs. 16-21 the contaminant will collect in the cells 121 as heretofore provided and a soft mass of sludge will be colected in the cells. Additional filtrate will pass through this sludge. Sludge thus formed will assist in causing any unremoved finer particles in the filtrate to be deposited as the filtrate passes therethrough and through the crevices between the spacer plies or the crevices between the spacers and the walls. As flow continues, the contaminant may become more firmly compacted and a cake-like mass eventually formed. When such cake does form there will be a line of cleavage between the cake or contaminant and the wall through which the filtrate may pass that the flow may continue. This flow will continue in this manner until the cells 121 are full of contaminant after which the useful life of the stack so formed is ended and a new cartridge must be utilized for replacement.

It will be readily apparent that various forms of wall members and spacer members may be provided to provide for flow in a single direction or flow in two directions, that the form of the wall and spacer also govern to a large extent the amount of cell capacity for contaminant and the speed of flow of the filtrate through the stack of walls. The filtrate in all cases flows generally parallel to the supporting surface of the walls which go to form the cells for the contaminant, the flow either occurring through the crevices formed by the two members coming in contact or through one of the members generally parallel to its surface. The filtrate takes the path of least resistance for escape as less resistance is thus incurred during its passage. The contaminant builds up against the direction of flow until the cells are completely full. The accumulation in all cases is generally outward in the unidirectional flow or radially inward and outward in the flow in two directions such as shown in Figs. 10 to 16. The increase of the number of walls will increase the flow pasasges in the stack while at the same time diminishing the size of the cell capacity for contaminant deposit, one being increased at the expense of the other and from this guide the filter may be built to be appropriate to the particular work it is to do. It will be immaterial whether the axis of the stack be vertical or horizontal, the pressure under which the operation occurs being such as to cause this to be substantially immaterial.

The by-passing of liquid as indicated in the description of the upper part of the stack and the plate through which pressure is applied permits of the filter being warmed by flow through this by-pass portion until sufficiently heated so that filtration throught the stack of walls may occur. This by pass also prevents the filter from clogging to stop the flow of oil through the casing.

The fin wall or support upon which contaminant may collect as the filtrate passes through a crevice or into a wall provides an advantage in connection with filters of this character and greatly adds to the efficiency and life of the filter. This application is a continuation in part of my co-pending application Serial No. 443,934.

I claim:

1. A liquid filtering unit comprising only two shape members, there being wall members separated by spacer members, both of sheet material and in surface to surface contact, one of said members being permeable to transmit filtrate therethrough, each of said members having an opening located inwardly from its periphery, and said openings registering sufficiently to provide an internal drainage passage for liquid from said members, the spacer members having a skeleton structure with wall supporting arms presenting surface contact areas less than the areas of the surfaces of the wall members with which they contact and spaced to provide between them an access for the entering liquid to be filtered whereby to reduce the path of travel of the liquid when flowing in the direction of the contact surfaces and to provide inter-wall cells in which sludge material may collect.

2. A liquid filtering unit as set forth in claim 1 wherein both of said members are permeable to pass filtrate therethrough.

3. A liquid filtering unit as set forth in claim 1 wherein said wall member is permeable to pass filtrate therethrough.

4. A liquid filtering unit as set forth in claim 1 wherein said spacer member is permeable to pass filtrate therethrough.

5. A liquid filtering unit as set forth in claim 1 wherein the filtrate permeable material is a cellulosic material.

6. A liquid filtering unit as set forth in claim 1 wherein said skeleton structure extends to adjacent the peripheral edges of said wall member to provide a broad suport therefor.

7. A liquid filtering unit as set forth in claim 1 wherein the wall and spacer members are stacked in the form of a column.

8. A liquid filtering unit as set forth in claim 1 wherein said skeleton structure comprises spokes rediating from the opening which form the internal passage.

9. A liquid filtering unit as set forth in claim 1 wherein resilient means press said wall and spacer members together.

10. A liquid filtering unit as set forth in claim 1 wherein a spring presses said wall and spacer members together.

11. A liquid filtering unit as set forth in claim 1 wherein a recess is provided in one of the end wall members leading to the drainage opening to by pass the members.

12. A liquid filtering unit comprising an assembly of only two shape members, there being wall and spacer members disposed face to face and having apertures providing for liquid passage lengthwise through the assembly, a slot system in the members extending toward the aperture, one of the members completely covering the slots in the other member, said spacer members serving as wall-member-positioning and flow-controlling means between the several wall members, while leaving portions of the wall members exposed for the collecting of removed matter therealong.

13. For use in liquid filtration, an assembly of sets of individually alternated wall members and spacer members of two shapes only, said wall and spacer members being of different surface areas one of said members being pervious to filtrate material, apertures therein providing for liquid passage lengthwise of the assembly, slot formations transversely disposed in one set of members extending toward said aperture and completely covered by the other members, the other members cooperatively positioned to provide crevice-like passages around and leading to slots and to edge portions of the surface members, while leaving surface areas exposed over a portion of said areas for the deposit of matter filtered out from liquid approaching said crevice-like passage and egressing thereat as filtrate.

14. A liquid filtering unit comprising an assembly of coaxial spaced wall members having apertures providing for liquid passage lengthwise the assembly, elongated slots in the wall members extending toward said apertures, and flow-controlling spacer means between the several wall members, said means covering the bordering edges of the wall members slots and cooperating with the wall members to present a particleexcluding crevice-like passage for escape of filtrate from between the wall members and along the slots while leaving portions of the wall members exposed for the collecting of removed matter therealong.

15. For use in liquid filtration, a plurality of wall members having a central aperture, a corresponding plurality of spacer members of different shape, said members assembled in individually alternating coaxial position to form a filter unit with the wall members extending beyond the spacer members to provide the opposite walls of cellular compartments between successive wall members, the wall members having therein elongated slots extending toward said aperture with at least one closed end, and the spacer members being shaped and arranged to completely cover said slots and laterally to define said cellular compartments and to present with the wall members a crevice formation for egress of filtrate from the compartments at edge portions of the wall members and of their slots.

16. In a filtering unit, a series of flatwise contiguous wall and intermediate spacer members of lesser area spacing adjacent walls, said walls being provided with elongated slots, said spacer members covering the several slots in overlapping relation to their edges and affording crevice-like filtering passages communicating between the slots and the adjacent inter-wall spaces, and a drainage opening in each member registering with each other for the drainage of filtrate from the wall slots.

17. A liquid filtering unit comprising an assembly of flow-directing and deposit-positioning circular walls coaxially aligned in adjacent spaced relation, retaining means at the ends of the assembly, central apertures in the walls, the latter also having in their areas between said apertures and their outer edges a system of elongated slots traversing said area, and means comprising a skeleton frame between adjacent walls entirely covering said slots and maintaining their relative spacing and defining with them at edge portions of the walls and their slots, a filtrate passage in the plane of the walls and having a normal operating width not exceeding the average size of particles to be filtered out while leaving the walls exposed over a portion of said areas for the deposit of the removed matter.

18. In a liquid filter a plurality of walls having a central opening with radiating slots extending from said openings, spacers between said walls each comprising a smaller disc having a central opening registering with the central opening of said wall and with radiating arms completely covering said slots in said walls to provide a cellular space bounded by two radiating arms and said walls.

19. A liquid filtering unit comprising only two shape members, there being wall members separated by spacer members, both of sheet material and in surface to surface contact, each of said members having an opening inwardly from its periphery, and said openings registering sufficiently to provide an internal drainage passage for liquid from said members, the spacer members presenting surface contact areas less than the areas of the surfaces of the wall members with which they contact so that their edges form cell edges at a location to reduce the filtering path of travel of the liquid when flowing in the direction of the contact surfaces and to provide inter-wall cells in which sludge material may collect, at least one of said members having slots therein along the surface contact area and inwardly from the cell forming edges of the area, said slots extending to said internal passage.

20. A liquid filtering unit as set forth in claim 19 wherein one of said members is a cellulosic filtrate permeable material.

21. A liquid filtering element as set forth in claim 19 wherein said wall member is slotted along the surface contact area and inwardly from the cell forming edges of the area to provide a conduit to said internal passage.

22. A liquid filtering element as set forth in claim 19 wherein said spacer member is slotted along the surface contact area and inwardly from the cell forming edges of the area to provide a conduit to said internal passage.

23. A liquid filtering element as set forth in claim 19 wherein said wall member is permeable to pass filtrate therethrough.

24. A liquid filtering element as set forth in claim 19 wherein said spacer member is permeable to pass filtrate therethrough.

25. A liquid filtering unit as set forth in claim 19 wherein resilient means press said wall and spacer members together.

26. A liquid filtering unit as set forth in claim 19 wherein a spring presses said wall and spacer members together.

27. A liquid filtering unit as set forth in claim 19 wherein a recess is provided in one of the end wall members leading to the drainage opening to by pass the members.

28. A liquid filtering unit comprising wall members having central aligned openings therethrough, spacer members separating said wall members at said openings by encirclement of the openings and at their peripheries by extending therealong said encirclement portions being spaced from each other to form voids between them, thereby providing collecting cells, one of said members being filtrate permeable, said wall members having further openings to permit the passage of liquid to be filtered from one cell to another for entering said cells while the contaminant deposits on the wall of the cells as the filtrate passes inwardly and outwardly from the cells.

29. A liquid filtering unit comprising wall members having central aligned openings therethrough, spacer members separating said wall members at said openings by encirclement of the openings and at their peripheries by extending therealong said encirclement portions being spaced from each other to form voids between them, thereby providing collecting cells, spokes extending between said inner and outer encircling portions, one of said members being filtrate permeable, said wall members having openings to permit the passage of liquid to be filtered from one cell to another for entering said cells while the contaminant deposits on the walls of the cells as the filtrate passes inwardly and outwardly from the cells.

30. A liquid filtering unit as set forth in claim 28 wherein resilient means presses said wall and spacer members together.

RICHARD V. HICKS.

(References on following page)

REFERENCES CITED

The following references are of record in the file of this patent:

UNITED STATES PATENTS

| Number | Name | Date |
|---|---|---|
| 893,070 | Gobbi | July 14, 1908 |
| 1,035,248 | Seavey | Aug. 13, 1912 |
| 1,172,728 | Perkins | Feb. 22, 1916 |
| 1,641,485 | Heftler | Sept. 6, 1927 |
| 1,643,299 | Furness | Sept. 27, 1927 |
| 1,701,556 | Blackmore | Feb. 12, 1929 |
| 1,750,073 | Walsh | Mar. 11, 1930 |
| 1,768,350 | Chase | June 24, 1930 |
| 1,773,797 | Hele-Shaw | Aug. 26, 1930 |
| 1,793,583 | Bowden | Feb. 24, 1931 |
| 1,804,512 | Pickard | May 12, 1931 |
| 1,976,547 | Dumas | Oct. 9, 1934 |
| 1,977,174 | Crawford | Oct. 16, 1934 |
| 2,031,165 | Johnson | Feb. 18, 1936 |
| 2,100,266 | Perry | Nov. 23, 1937 |
| 2,116,537 | Miller | May 10, 1938 |
| 2,141,436 | Harris | Dec. 27, 1938 |
| 2,184,243 | Belyavin | Dec. 19, 1939 |
| 2,190,014 | Colas | Feb. 13, 1940 |
| 2,247,445 | Long | July 1, 1941 |
| 2,269,725 | Malanowski | Jan. 13, 1942 |
| 2,304,618 | Williams | Dec. 8, 1942 |
| 2,306,823 | Meldrum | Dec. 29, 1942 |
| 2,354,150 | Skinner | July 18, 1944 |
| 2,359,475 | Gauthier | Oct. 3, 1944 |
| 2,365,525 | Cox | Dec. 19, 1944 |
| 2,389,431 | Hallinan | Nov. 20, 1945 |

FOREIGN PATENTS

| Number | Country | Date |
|---|---|---|
| 35,625 | France | Oct. 1, 1929 |
| 226,470 | Great Britain | Dec. 18, 1924 |
| 300,600 | Great Britain | Nov. 16, 1928 |
| 666,474 | France | May 27, 1929 |
| 776,239 | France | Oct. 31, 1934 |